Jan. 30, 1951  D. R. CORNING  2,539,507
DUMPING DEVICE

Filed April 21, 1949  2 Sheets-Sheet 1

Inventor
Donald R. Corning
by M. Talbert Dick
Attorney

Witness
Merle A. Bjork

Jan. 30, 1951  D. R. CORNING  2,539,507
DUMPING DEVICE

Filed April 21, 1949  2 Sheets-Sheet 2

Inventor
Donald R. Corning
by M. Talbert Dick
Attorney

Witness
Merle A. Bjork

Patented Jan. 30, 1951

2,539,507

UNITED STATES PATENT OFFICE 2,539,507

DUMPING DEVICE

Donald Roy Corning, Wick, Iowa

Application April 21, 1949, Serial No. 88,703

4 Claims. (Cl. 298—15)

The principal object of my invention is to provide a vehicle that will easily and quickly elevate its box for dumping purposes regardless of the position or weight balance of the material in the box.

A further object of this invention is to provide a tiltable box vehicle that will automatically tilt the box compartment for dumping purposes when the rear wheels of the vehicle are blocked or braked and the front wheels are thereafter moved to the rear relative to the vehicle chassis.

A still further object of my invention is to provide a self-dumping vehicle that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

The idea of raising the front end of a wagon or like box for dumping the contents therein from its rear open end is generally old. Usually such dumping vehicles employ hydraulic means, which is not only costly but heavy. Others have tried to tilt the box by gears, rods and like. The objections to the latter methods are that they are not capable of functioning with heavy loads, make for a very unstable vehicle, and experience failures if the material to be ejected is initially at the front end of the box. I have overcome such objections and problems as will hereinafter be appreciated.

Figure 1:
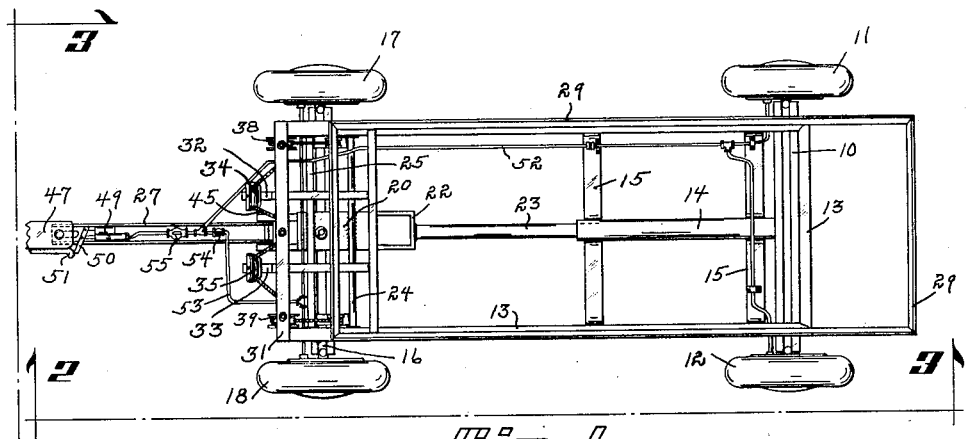
Fig. 1 is a top plan view of the vehicle with the main box compartment removed.
Figure 2:
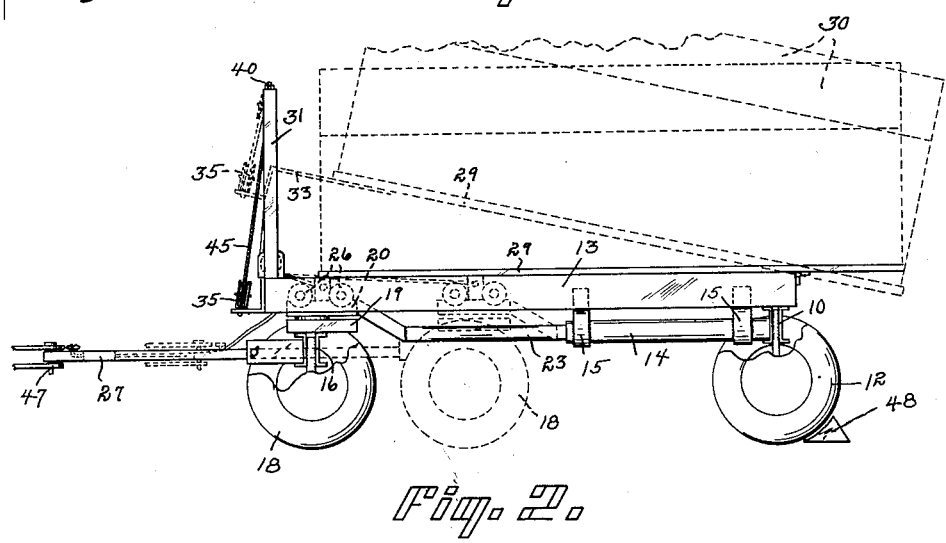
Fig. 2 is a side view of my vehicle taken from line 2—2 of Fig. 1 and with a box thereon.
Figure 3:
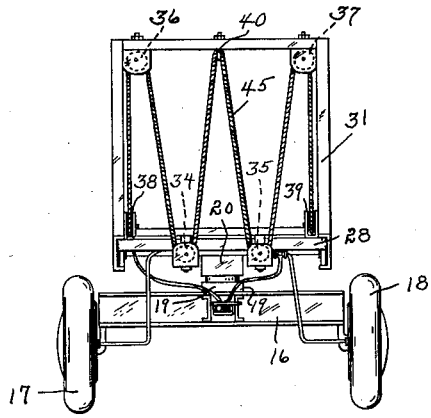
Fig. 3 is a front view of my device taken from line 3—3 of Fig. 1.
Figures 4, 5:
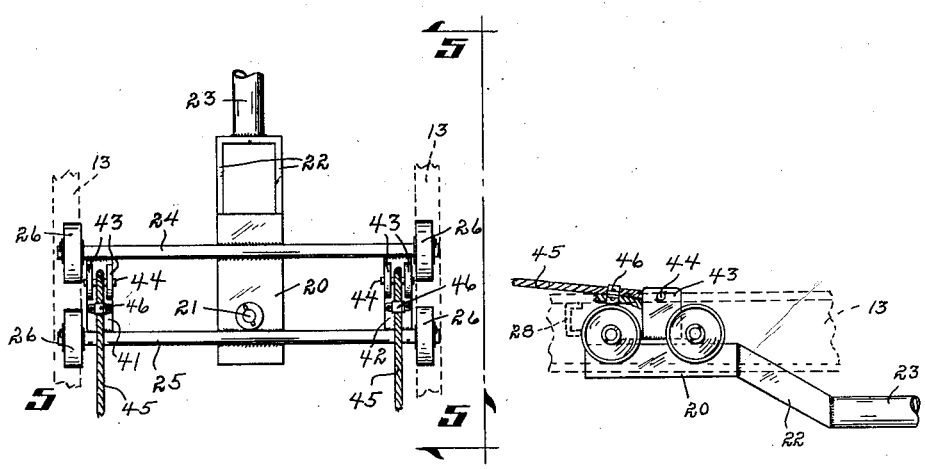
Fig. 4 is a top plan view of a portion of the operating mechanism of the dumping vehicle.
Fig. 5 is a side view of a portion of the operating mechanism taken from line 5—5 of Fig. 4.

Referring to the drawings I have used the numeral 10 to designate the back cross beam of the vehicle chassis. Suitably mounted to this beam are the two wheels 11 and 12. The numeral 13 designates the rectangular chassis frame secured at its rear end portion to the beam 10. These described elements of the vehicle are substantially standard and no claim is made to them except the two sides of the rectangular chassis frame should be made of channel iron construction with the open sides thereof extending inwardly, as shown in Fig. 3. The numeral 14 designates a horizontal guide tube secured to the center of the beam 10 and extending forwardly, as shown in Fig. 1. Cross braces 15 on the frame 13 are present to rigidly hold the tube 14 in proper place. The numeral 16 designates the front cross beam of the chassis and to which are secured the front wheels 17 and 18. The numeral 19 designates the turnplate on the center top of the front axle beam 16. The numeral 20 designates the fixed turnplate. These two turnplates are rotatably secured together by any suitable means such as the vertical pin shaft 21. The fixed plate 20 has a portion 22 that extends downwardly and rearwardly for horizontal alignment with the guide tube 14. The numeral 23 designates a tube shaft secured to the rear end of the portion 22 and extending rearwardly for sliding movement in the guide tube 14. The numerals 24 and 25 designate two spaced apart shafts secured to the top of the plate 20 and extending transversely of the longitudinal axis of the chassis, as shown in Fig. 4. On each end of each of the shafts 24 and 25 is a wheel roller 26. These wheels 26 may roll backwardly and forwardly in the two side channel iron beams respectively of the rectangular chassis frame. By this arrangement the front wheel unit may be turned by the tongue 27 and may also, within limits, move either rearwardly or forwardly relative to the back wheels and chassis frame, as shown by dotted lines in Fig. 2. The front crossbar 28 of the chassis frame will limit the forward rolling action of the roller wheels 26 and the rear axle beam 10 will limit the rear sliding movement of the tube shaft 23. The numeral 29 designates a box support rectangular frame hinged near its rear end to the rear end of the chassis frame. A wagon or like box 30 shown by dotted lines in Fig. 2 is attached to and supported by this frame 29. The numeral 31 designates a vertical rectangular frame mounted on the front end of the chassis frame and forward of the box 30. The numerals 32 and 33 designate two spaced apart forwardly extending arms on the front end of the frame 29. These two arms are centrally located as shown in Fig. 3 and extend through the vertical frame. Rotatably mounted on the forward ends of the two arms are the two pulley wheels 34 and 35, respectively. These two wheels are arranged transversely of the vehicle but tilt upwardly and rearwardly, as shown in Fig. 2. The numerals 36 and 37 designate two similar pulley wheels rotatably mounted in the two upper corners of the vertical frame, respectively. These two wheels are also transversely arranged and tilt downwardly and forwardly to operate with the wheels 34 and 35. The numerals 38 and 39 designate two pulley wheels rotatably mounted in the two lower corners respectively of the vertical frame. These two wheels 38 and 39 are arranged parallel with the longitudinal axis of the vehicle. The numeral 40 designates a rope or cable clamp on the center top of the vertical frame. The numerals 41 and 42 designate two webs spaced apart, secured to, and extending between the two shafts 24 and 25. These two webs each have ears 43 and a pin 44 for fastening a rope or cable thereto. The numeral 45 designates a rope or cable secured at its center to the member 40. From the member 40 the rope or cable 45 has its two lengths extending therefrom, first extending downwardly to embrace the two wheels 34 and 35, respectively, thence upwardly to embrace the two wheels 36 and 37 respectively, thence downwardly to engage the wheels 38 and 39 respectively, thence rearwardly to connect with the two pins 44 respectively. A rope or cable clamp means 46 may be used to affect this connection, as shown in Fig. 4. By this arrangement, when the vehicle is being pulled by a tractor, truck or like secured to its tongue by a clevis or like connection 47, the front wheel unit will be forwardly positioned relative to the remainder of the vehicle. However, if the back wheels are prevented from moving rearwardly by the block 48 or are braked, and pressure is exerted on the tongue rearwardly, the front wheel unit will move backwardly relative to the remainder of the vehicle. This latter action moves the fixed plate 20, shafts 24 and 25 and rollers 26 accordingly rearwardly. As the two ends of the rope or cable 45 are attached to these parts the rope or cable will be shortened at the vertical frame 31, thereby causing the pulley wheels 34 and 35 to move upwardly accordingly. Obviously, this raises the front end of the box frame 29 and the box 30 accordingly, as shown by dotted lines in Fig. 2, thereby dumping the material out of the rear end of the box. Due to the pulley wheel and rope construction great leverage is obtained and the heaviest loads are easily lifted. Any type of wheel braking method may be used. In the drawings I show the well known and common hydraulic brake system. The numeral 49 designates the master cylinder actuated by the lever 50. The fastening means 47 may be slotted, as shown in Fig. 1 to permit limited movement so that lug 51 may actuate the lever 50 when the tractor or like moves backwardly relative to the vehicle or when the vehicle moves forwardly upon the prime mover. A flexible hydraulic line 52 leads to the rear wheel brakes and a like line 53 to the front wheel brakes. A manually operated valve 54 is imposed in the line 53 so as to render the front wheel brakes ineffective when it is desired that only the back wheels be braked for the purpose of elevating the box 30. After the box has been emptied, the forward movement of the front wheel unit will gently lower the box back into normal horizontal position. The valve 54 should be opened at this time so that all wheel brakes will be operable. If it is desired the main cut-off valve may be closed and a back wheel block 48 used to prevent rear movement of the back wheel assembly.

While my device is shown as a relatively short coupled vehicle, it is obvious that it can be manufactured even shorter coupled or considerably elongated. Therefore, in some structures it might be found that during the unloading process the front wheels would move to the rear to such an extent that if a preponderance of the weight of the material were in the front of the wagon box the entire device might over-balance forwardly. In such cases some support should be placed under the front end of the chassis frame. Also if desired the front wheels could be mounted by standard practice and merely the tongue unit be slidably mounted longitudinally of the chassis frame.

Some changes may be made in the construction and arrangement of my dumping vehicle without departing from the real spirit and purpose of my invention, and it is my intention to cover by my claims, any modified forms of structure or use of mechanical equivalents which may be reasonably included within their scope.

I claim:

1. In a device of the class described, a horizontal chassis frame, rear support wheels on said chassis frame, a box supporting frame hinged to the rear end portion of said chassis frame, a vertical frame secured to the forward end portion of said chassis frame, a front wheel unit longitudinally slidably mounted on the front end portion of said chassis frame, a pulley wheel operatively secured to the front end portion of said box support frame, a pulley wheel operatively secured to the upper portion of said vertical frame, a pulley wheel operatively secured within the lower portion of said vertical frame, and an elongated flexible member having one end secured to the said front wheel unit and another portion secured to the upper portion of said vertical frame with its length engaging all three of said pulley wheels; said elongated flexible member and said pulley wheels capable of acting to raise the front end of said box frame when said front wheel unit is slid rearwardly relative to said rear support wheels.

2. In a device of the class described, a horizontal chassis frame, rear support wheels on said chassis frame, a box supporting frame hinged to the rear end portion of said chassis frame, a vertical frame secured to the forward end portion of said chassis frame, a front wheel unit longitudinally slidably mounted on the front end portion of said chassis frame, two spaced apart pulley wheels operatively secured to the front end of said box support frame, two spaced apart pulley wheels operatively secured to the upper portion of said vertical frame, two spaced apart pulley wheels secured within the lower portion of said vertical frame, and a cable member having its center length secured to the upper portion of said vertical frame and its two portions extending therefrom, first, extending downwardly to embrace the first two mentioned pulley wheels respectively, thence upwardly to embrace the second two mentioned pulley wheels, respectively, thence downwardly to engage the third mentioned two pulley wheels respectively, and then to and attached to the said front wheel unit.

3. In a device of the class described, a horizontal chassis frame, rear support wheels on said chassis frame, a box supporting frame hinged to the rear end portion of said chassis frame, a vertical frame secured to the forward end portion of said chassis frame, a front wheel unit longitudinally slidably mounted on the front end portion of said chassis frame, two spaced apart pulley wheels operatively secured to the front end of said box support frame, two spaced apart pulley wheels operatively secured to the upper portion of said vertical frame, two spaced apart pulley wheels secured within the lower portion of said vertical frame, and a cable member having its center length secured to the upper portion of vertical frame and its two portions extending therefrom, first, extending downwardly to embrace the first two mentioned pulley wheels respectively, thence upwardly to embrace the second two mentioned pulley wheels, respectively, thence downwardly to engage the third mentioned two pulley wheels respectively, then to and attached to the said front wheel unit, and a means for preventing the rear movement of said rear support wheels at times and independent of the movement of said front wheel unit.

4. In a device of the class described, a horizontal chassis frame, rear support wheels on said chassis frame, a box supporting frame hinged to the rear end portion of said chassis frame, a vertical frame secured to the forward end portion of said chassis frame, a front wheel unit having at least a tongue capable of longitudinal sliding movement relative to the said chassis frame, a pulley wheel operatively secured to the front end portion of said box support frame, a pulley wheel operatively secured to the upper portion of said vertical frame, a pulley wheel operatively secured within the lower portion of said vertical frame, and an elongated flexible member having one end operatively secured to said tongue and another portion secured to the upper portion of said vertical frame with its length engaging all three of said pulley wheels; said elongated flexible member and said pulley wheels capable of acting to raise the front end of said box frame when said tongue is slid rearwardly relative to said chassis frame.

DONALD ROY CORNING.

REFERENCES CITED

The following references are of record in the file of this patent:

UNITED STATES PATENTS

| Number | Name | Date |
|---|---|---|
| 269,539 | Reed | Dec. 26, 1882 |
| 422,561 | Worthington | Mar. 4, 1890 |
| 952,943 | Peterson | Mar. 22, 1910 |